(12) United States Patent
Luo et al.

(10) Patent No.: US 12,251,680 B2
(45) Date of Patent: Mar. 18, 2025

(54) HIERARCHICAL POROUS DEFECT UiO-66 MATERIAL AND ITS PREPARATION METHOD

(71) Applicant: Shanghai Jiao Tong University, Shanghai (CN)

(72) Inventors: Jinming Luo, Shanghai (CN); Chunyu Lv, Shanghai (CN); Yitao Pan, Shanghai (CN); Nanwen Zhu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 18/641,338

(22) Filed: Apr. 20, 2024

(65) Prior Publication Data
US 2024/0424476 A1  Dec. 26, 2024

(30) Foreign Application Priority Data
Jun. 25, 2023  (CN) .......................... 202310753551.4

(51) Int. Cl.
| | |
|---|---|
| *B01J 20/22* | (2006.01) |
| *B01J 20/28* | (2006.01) |
| *B01J 20/30* | (2006.01) |
| *C07F 7/00* | (2006.01) |

(52) U.S. Cl.
CPC ......... *B01J 20/226* (2013.01); *B01J 20/2808* (2013.01); *B01J 20/28083* (2013.01); *B01J 20/3071* (2013.01); *B01J 20/3078* (2013.01); *B01J 20/3085* (2013.01); *C07F 7/003* (2013.01)

(58) Field of Classification Search
CPC .................. B01J 20/226; B01J 20/2808; B01J 20/28083; B01J 20/3071; B01J 20/3078; C07F 7/003

USPC ......................................................... 502/401
See application file for complete search history.

(56) References Cited

U.S. PATENT DOCUMENTS

| | | | |
|---|---|---|---|
| 9,474,997 B1 * | 10/2016 | Peterson | ................ B01J 20/226 |
| 11,666,637 B2 * | 6/2023 | Farha | .................. A61K 9/5115 |
| | | | 514/5.9 |

FOREIGN PATENT DOCUMENTS

| | | | | |
|---|---|---|---|---|
| CN | 108114699 B | * | 12/2020 | ............ B01J 20/226 |
| CN | 113522287 A | * | 10/2021 | ............ B01J 21/066 |
| CN | 113600141 A | * | 11/2021 | |
| CN | 113871793 A | * | 12/2021 | |
| CN | 110404510 B | * | 1/2022 | ............ B01J 20/226 |

* cited by examiner

*Primary Examiner* — Cam N. Nguyen
(74) *Attorney, Agent, or Firm* — Bryan D. Zerhusen; Nicholas R. Herrel; CANTOR COLBURN LLP

(57) ABSTRACT

Provided are a hierarchical porous defect UiO-66 material and a preparation method thereof. The method includes the following steps: mixing a zirconium ion source, a mixed ligand, an organic acid, an organic good solvent, and water to obtain a mixture; and subjecting the mixture to reaction while heating, washing, freeze-drying, and heat treatment in sequence to obtain the hierarchical porous defect UiO-66 material; where hierarchical pores of the hierarchical porous defect UiO-66 material comprise micropores and mesopores; the micropores each have a pore size of not greater than 2 nm; the mesopores each have a pore size of 2 nm to 4 nm; the mixed ligand includes terephthalic acid and a trisubstituted benzene series; and the trisubstituted benzene series is one or two selected from the group consisting of 2-aminoterephthalic acid and 2-aminoisophthalic acid.

12 Claims, 12 Drawing Sheets

HIERARCHICAL POROUS DEFECT UiO-66 MATERIAL AND ITS PREPARATION METHOD

CROSS REFERENCE TO RELATED APPLICATION

This patent application claims the benefit and priority of Chinese Patent Application No. 202310753551.4 filed with the China National Intellectual Property Administration on Jun. 25, 2023, the disclosure of which is incorporated by reference herein in its entirety as part of the present application.

TECHNICAL FIELD

The present disclosure relates to the technical field of preparation of organic porous materials, and in particularly to a hierarchical porous defect UiO-66 material and a preparation method thereof.

BACKGROUND

Metal-organic frameworks (MOFs) are emerging organic-inorganic hybrid porous materials formed by coordination interactions between metal ions or ion clusters and organic ligands. The MOFs have received widespread attention from researchers in recent years. A UiO-66 (UiO being the abbreviation for University of Oslo) material is formed from a zirconium metal center and an organic ligand terephthalic acid, and has a high specific surface area of (600-1,600) $m^2/g$ depending on different experimental conditions, which shows excellent water stability and chemical stability, as well as strong acid resistance and certain alkali resistance.

The UiO-66 material has two types of microporous structure, one being a regular octahedral cage with a pore size of about 1.1 nm, and the other being a regular tetrahedral cage with a pore size of about 0.8 nm. Owing to the micropore size of the UiO-66 material, an internal mass transfer efficiency of the UiO-66 material is limited. Further, during applications such as adsorption and catalysis, there are also certain requirements for the size of a target (i.e., the size of the target should be lower than the micropore size). These factors greatly limit the application of the UiO-66 material. The researchers have successfully constructed a UiO-66 material with missing ligand defects by using monocarboxylic acids as modulators, thereby expanding the pore size to a certain extent. However, test and calculation results show that the pore size still belongs to a micropore category.

Zhou Hongcai et al. have successfully constructed 3.8 nm mesopores in a microporous material PCN-250 (with a pore size of 0.8 nm to 1 nm) by Soxhlet extraction, while this method suffers from tedious operations and uncontrollable mesopore content. In addition, a hydrolysis method of mixed ligands is also commonly used, and the mesopore content could be controlled to a certain extent by changing a content of the mixed ligands. However, this method requires that the ligands in the material are long in size, easy to be hydrolyzed, and have strong acid resistance.

SUMMARY

An object of the present disclosure is to provide a hierarchical porous defect UiO-66 material and a preparation method thereof. In the present disclosure, the method has simple steps, a controllable mesopore content of the hierarchical porous defect UiO-66 material, and no special requirements for ligands.

To achieve the above object, the present disclosure provides the following technical solutions:

The present disclosure provides a method for preparing a hierarchical porous defect UiO-66 material, including the following steps:

mixing a zirconium ion source, a mixed ligand, an organic acid, an organic good solvent, and water to obtain a mixture; and subjecting the mixture to reaction under heating, washing, freeze-drying, and heat treatment in sequence to obtain the hierarchical porous defect UiO-66 material;

where hierarchical pores of the hierarchical porous defect UiO-66 material include micropores and mesopores; the micropores each have a pore size of not greater than 2 nm; and the mesopores each have a pore size of 2 nm to 4 nm; and the mixed ligand comprises terephthalic acid and a trisubstituted benzene series; and the trisubstituted benzene series is one or two selected from the group consisting of 2-aminoterephthalic acid and 2-aminoisophthalic acid.

In some embodiments, the zirconium ion source is one or two selected from the group consisting of zirconium chloride and zirconium oxychloride;

the organic acid is one or more selected from the group consisting of formic acid, acetic acid, and benzoic acid; and the organic good solvent is N,N-dimethylformamide (DMF).

In some embodiments, a molar ratio of the zirconium ion source to the mixed ligand is in a range of 1:0.5 to 1:2;

a molar ratio of the zirconium ion source to the organic good solvent is in a range of 1:130 to 1:520;

a molar ratio of the zirconium ion source to the organic acid is in a range of 1:10 to 1:200; and a molar ratio of the zirconium ion source to the water is in a range of 1:0.5 to 1:2.

In some embodiments, a molar ratio of the terephthalic acid to the trisubstituted benzene series is in a range of (0-1):(0-1), excluding 0.

In some embodiments, the reaction under heating is conducted at a temperature of 120° C. to 160° C. for 24 h to 72 h.

In some embodiments, the freeze-drying is conducted at a temperature of −60° C. to −40° C. for 18 h to 36 h.

In some embodiments, the heat treatment is conducted at a temperature of 325° C. to 375° C. for 0.25 h to 4 h.

In some embodiments, the washing is performed by subjecting a resulting system after the reaction under heating to centrifugal washing with DMF, centrifugal washing with an alcohol, and centrifugal washing with water.

In some embodiments, the centrifugal washing with the DMF is conducted not less than 2 times; the centrifugal washing with the alcohol is conducted not less than 2 times; and the centrifugal washing with the water is conducted not less than 2 times.

The present disclosure also provides a hierarchical porous defect UiO-66 material prepared by the method described above, where the hierarchical pores of the hierarchical porous defect UiO-66 material include the micropores and the mesopores; the micropores each have a pore size of not greater than 2 nm; and the mesopores each have a pore size of 2 nm to 4 nm.

The present disclosure provides a method for preparing a hierarchical porous defect UiO-66 material. In the traditional method for constructing ligand defects, monocarboxylic acid regulators (such as formic acid, organic acids, or benzoic acid) are used, and a resulting product still has microporous defect structures. In the method of the present disclosure, based on a difference in the thermal stability of the terephthalic acid and the trisubstituted benzene series, the terephthalic acid in the material structure could remain stable, while the trisubstituted benzene series could be pyrolyzed during the heat treatment; thus, the trisubstituted benzene series could be effectively and selectively removed, and mesoporous defect structures could be produced.

Compared with the existing methods for constructing mesoporous defects such as Soxhlet extraction and mixed ligand hydrolysis, the method provided by the present disclosure is simple to operate, and a product with high purity and yield could be obtained. The prepared hierarchical porous defect UiO-66 material could not only retain original microporous structures, but also generate mesoporous level defects, endowing the material with hierarchically porous properties. In addition, in the method, a proportion of mesoporous defects in the material could be efficient controlled by adjusting a ratio of the mixed ligand. In the present disclosure, a UiO-66 derivative material has been prepared by mixing the terephthalic acid and the trisubstituted benzene series, and then removing the trisubstituted benzene series in a resulting material at high temperature, such that the mesoporous defects could be successfully constructed.

The present disclosure also provides a hierarchical porous defect UiO-66 material prepared by the method described above, where the hierarchical pores of the hierarchical porous defect UiO-66 material include the micropores and the mesopores; the micropores each have a pore size of not greater than 2 nm; and the mesopores each have a pore size of 2 nm to 4 nm. In the present disclosure, the hierarchical porous defect UiO-66 material could not only retain original microporous structures, but also generate mesopore level defects, thereby exhibiting hierarchically porous properties.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those skilled in the art may still derive other accompanying drawings from these accompanying drawings without creative efforts.

DETAILED DESCRIPTION OF THE EMBODIMENTS

Figure 1:
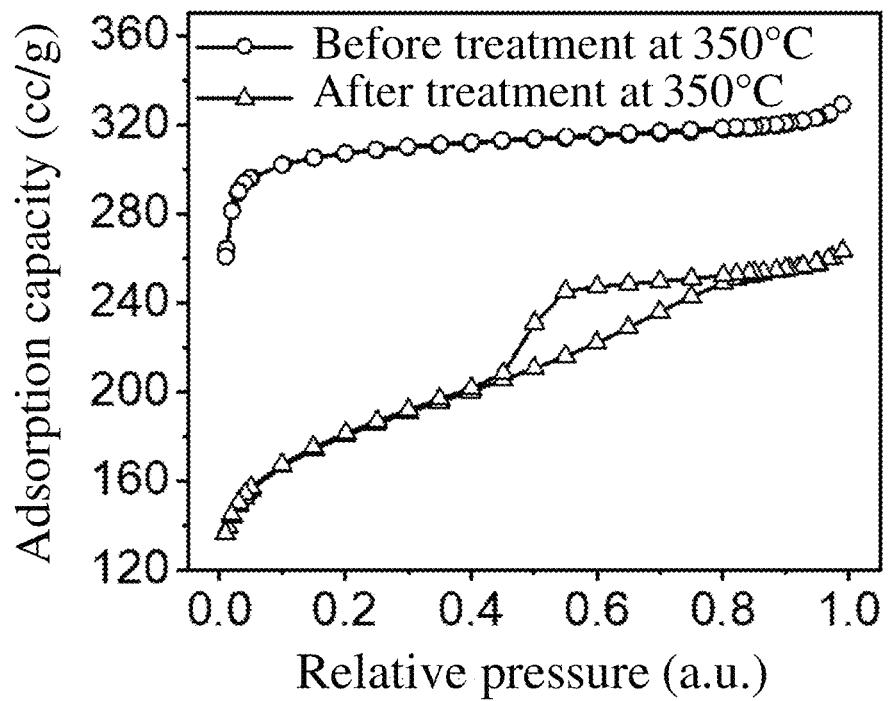
FIG. 1 shows nitrogen adsorption-desorption curves of the products obtained before and after heat treatment during constructing hierarchically porous defects of the UiO-66 material in Example 1 of the present disclosure.

The present disclosure provides a method for preparing a hierarchical porous defect UiO-66 material, including the following steps:

mixing a zirconium ion source, a mixed ligand, an organic acid, an organic good solvent, and water to obtain a mixture; and subjecting the mixture to reaction under heating, washing, freeze-drying, and a heat treatment in sequence to obtain the hierarchical porous defect UiO-66 material; where hierarchical pores of the hierarchical porous defect UiO-66 material include micropores and mesopores; the micropores each have a pore size of not greater than 2 nm; the mesopores each have a pore size of 2 nm to 4 nm.

In some embodiments of the present disclosure, the zirconium ion source includes one or two of zirconium chloride and zirconium oxychloride, preferably the zirconium chloride. In some embodiments, the mixed ligand includes terephthalic acid and a trisubstituted benzene series; and the trisubstituted benzene series includes one or two of 2-aminoterephthalic acid and 2-aminoisophthalic acid. In some embodiments, the organic acid includes one or more of formic acid, acetic acid, and benzoic acid. In some embodiments, the organic good solvent is DMF. In some embodiments, the water is deionized water.

In some embodiments, a molar ratio of the zirconium ion source to the mixed ligand is in a range of 1:0.5 to 1:2, preferably 1:0.7 to 1:1.5, and more preferably 1:0.9 to 1:1.1.

In some embodiments, a molar ratio of the zirconium ion source to the organic good solvent is in a range of 1:130 to 1:520, preferably 1:160 to 1:450, and more preferably 1:260 to 1:360.

In some embodiments, a molar ratio of the zirconium ion source to the organic acid is in a range of 1:10 to 1:200, preferably 1:50 to 1:150, and more preferably 1:80 to 1:120.

In some embodiments, a molar ratio of the zirconium ion source to the water is in a range of 1:0.5 to 1:2, preferably 1:0.8 to 1:1.5, and more preferably 1:1.1 to 1:1.2.

In some embodiments, a molar ratio of the terephthalic acid to the trisubstituted benzene series is in a range of (0-1):(0-1), excluding 0, preferably (1-9):(1-9), and more preferably (3-7):(3-7).

In some embodiments, the mixing is ultrasonic mixing. In some embodiments, the mixing is performed by: mixing the zirconium ion source and a part of the organic good solvent to obtain a zirconium ion source solution, mixing the mixed ligand and a remaining part of the organic good solvent to obtain a ligand source solution, premixing the ligand source solution and the zirconium ion source solution to obtain a premixed solution, and then ultrasonically mixing the premixed solution with the organic acid and the water.

In some embodiments, a mass ratio of the part of the organic good solvent to the remaining part of the organic good solvent is in a range of (0.5-1.5):(0.5-1.5), and preferably (0.9-1.1):(0.9-1.1).

In some embodiments, the reaction under heating is conducted at a temperature of 120° C. to 160° C., preferably 130° C. to 150° C., and more preferably 150° C. In some embodiments, the reaction under heating is conducted for 24 h to 72 h, preferably 36 h to 60 h, and more preferably 48 h.

In some embodiments, the washing is performed by subjecting a product obtained after the reaction under heating to centrifugal washing with DMF, centrifugal washing with an alcohol, and centrifugal washing with water.

In some embodiments, the centrifugal washing with the DMF is conducted not less than 2 times, and preferably 2 to 3 times. In some embodiments, the centrifugal washing with the alcohol is conducted not less than 2 times, and preferably 2 to 3 times; where the alcohol for the centrifugal washing includes one or two of methanol and ethanol. In some embodiments, the centrifugal washing with the water is conducted not less than 2 times, and preferably 2 to 3 times. In the present disclosure, the centrifugal washing with the DMF could partially remove incompletely reacted residual reactants in the material, the centrifugal washing with the alcohol could partially remove the remaining reactants and organic solvent DMF in the material, and the centrifugal washing with the water could partially remove alcohol and other residues remaining in the material to ensure an integrity of the pore structure inside the material.

In some embodiments, the freeze-drying is conducted at a temperature of −60° C. to −40° C., and preferably −55° C. to −45° C. In some embodiments, the freeze-drying is conducted for 18 h to 36 h, and preferably 22 h to 30 h.

In some embodiments, after the freeze-drying, a resulting material is subjected to grinding, until the resulting material has a target particle size of 0.1 μm to 200 μm, and preferably 0.1 μm to 50 μm.

In some embodiments, the heat treatment is conducted at a temperature of 325° C. to 375° C., preferably 330° C. to 370° C., and more preferably 340° C. to 360° C. In some embodiments, the heat treatment is conducted for 0.25 h to 4 h, and preferably 1 h to 3 h. In some embodiments, the heat treatment is conducted in a porcelain boat. In the method of the present disclosure, based on a difference in the thermal stability of the terephthalic acid and the trisubstituted benzene series, the terephthalic acid in a material structure could remain stable, while the trisubstituted benzene series could be pyrolyzed during the heat treatment; thus, the trisubstituted benzene series could be effectively and selectively removed, and mesoporous defect structures could be produced.

The present disclosure also provides a hierarchical porous defect UiO-66 material prepared by the method described above, where the hierarchical pores of the hierarchical porous defect UiO-66 material include the micropores and the mesopores; the micropores each have a pore size of not greater than 2 nm; and the mesopores each have a pore size of 2 nm to 4 nm.

In the present disclosure, the hierarchical porous defect UiO-66 material could not only retain original microporous structures, but also generate mesopore level defects, thereby exhibiting hierarchically porous properties.

In order to further illustrate the present disclosure, the technical solutions provided by the present disclosure are described in detail below in connection with accompanying drawings and examples, but these examples should not be understood as limiting the claimed scope of the present disclosure.

Example 1

(1) At ambient temperature, two 30 mL glass sample bottles were taken and numbered 1 and 2. 0.2331 g of zirconium chloride (1 mmol) was added into sample bottle 1, and 0.1163 g of terephthalic acid (0.7 mmol) and 0.0544 g of 2-aminoterephthalic acid (0.3 mmol) were added into sample bottle 2, such that a molar ratio of the zirconium chloride to ligands was 1:1.

(2) 10 mL of DMF was added into the sample bottles 1 and 2 separately, and resulting solutions were placed in an ultrasonic oscillator and ultrasonically treated until they were completely dissolved. Then, the ligand solution in sample bottle 2 was transferred to sample bottle 1, and 2.86 mL of acetic acid (50 mmol) and 20 μL of deionized water were added in sequence. A resulting reaction solution in sample bottle 1 was subjected to ultrasonic vibration for 0.5 min, and then transferred to a 120° C. oven and reacted for 24 h to obtain a yellow-brown UiO-66 material with a mixed ligand.

(3) The yellow-brown UiO-66 material with a mixed ligand in step (2) was transferred to a 50 mL centrifuge tube, and centrifuged at 6,000 rpm for 15 min. A resulting precipitate was washed and centrifuged 2 times with 20 mL of DMF to wash away residual mixed ligand and acetic acid in the material. Then, the precipitate was washed and centrifuged 2 times with 20 mL of methanol to wash away the residual mixed ligand, acetic acid, and DMF in the material. Then, the precipitate was washed and centrifuged 2 times with 20 mL of deionized water to wash away residual organic solvents in the material. A resulting washed sample was frozen in an ultra-low temperature refrigerator, and then transferred to a freeze dryer, and freeze-dried for 24 h to obtain a dried sample.

(4) The dried sample obtained in (3) was ground and added into a porcelain boat, then the porcelain boat was transferred to a muffle furnace and a resulting ground sample was subjected to heat treatment at a high temperature of 350° C. for 2 h to obtain a hierarchical porous defect UiO-66 material.

In step (4), the products before and after the heat treatment were subjected to adsorption capacity test, volume test, infrared test, and appearance characterization. The results are shown in FIG. 1 to FIG. 4.

As shown in FIG. 1, the material after the heat treatment shows a reduced nitrogen adsorption performance and a reduced specific surface area.

Figure 2:
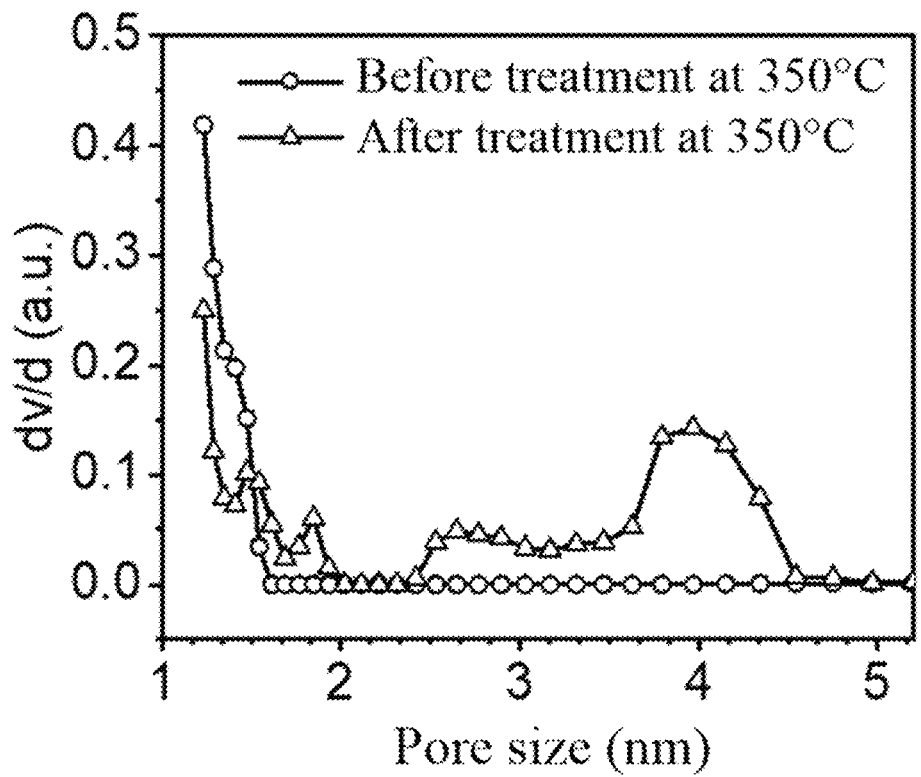
FIG. 2 shows a pore size distribution of the products obtained before and after heat treatment during constructing hierarchically porous defects of the UiO-66 material in Example 1 of the present disclosure.

As shown in FIG. 2, the material before heat treatment only has microporous structures less than 2 nm; after heat treatment, the material has mesoporous structures of 2 nm to 4 nm.

Figure 3:
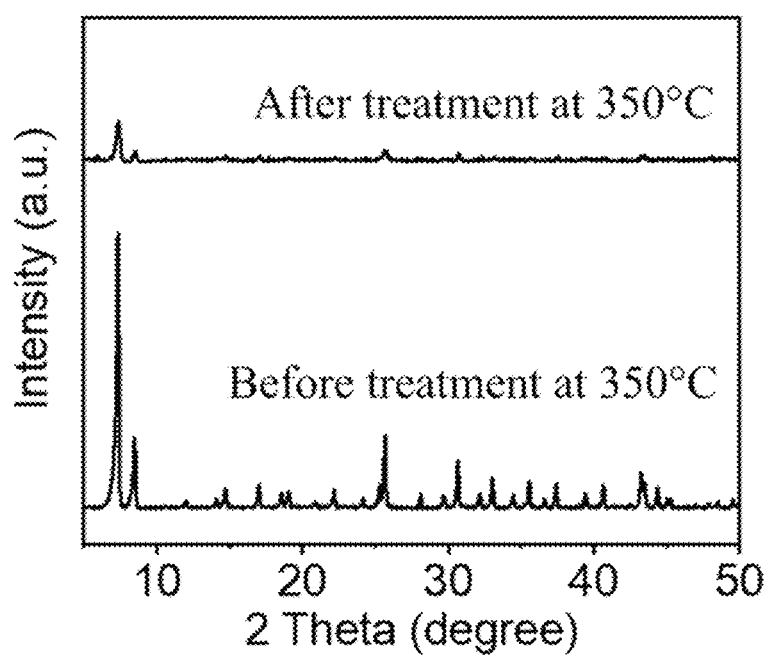
FIG. 3 shows X-ray diffraction (XRD) patterns of the products obtained before and after heat treatment during constructing hierarchically porous defects of the UiO-66 material in Example 1 of the present disclosure.

As shown in FIG. 3, although the material after the heat treatment shows a slightly reduced peak intensity, its characteristic peak position does not change significantly, indicating that the crystal structure of the material does not change significantly.

Figure 4:
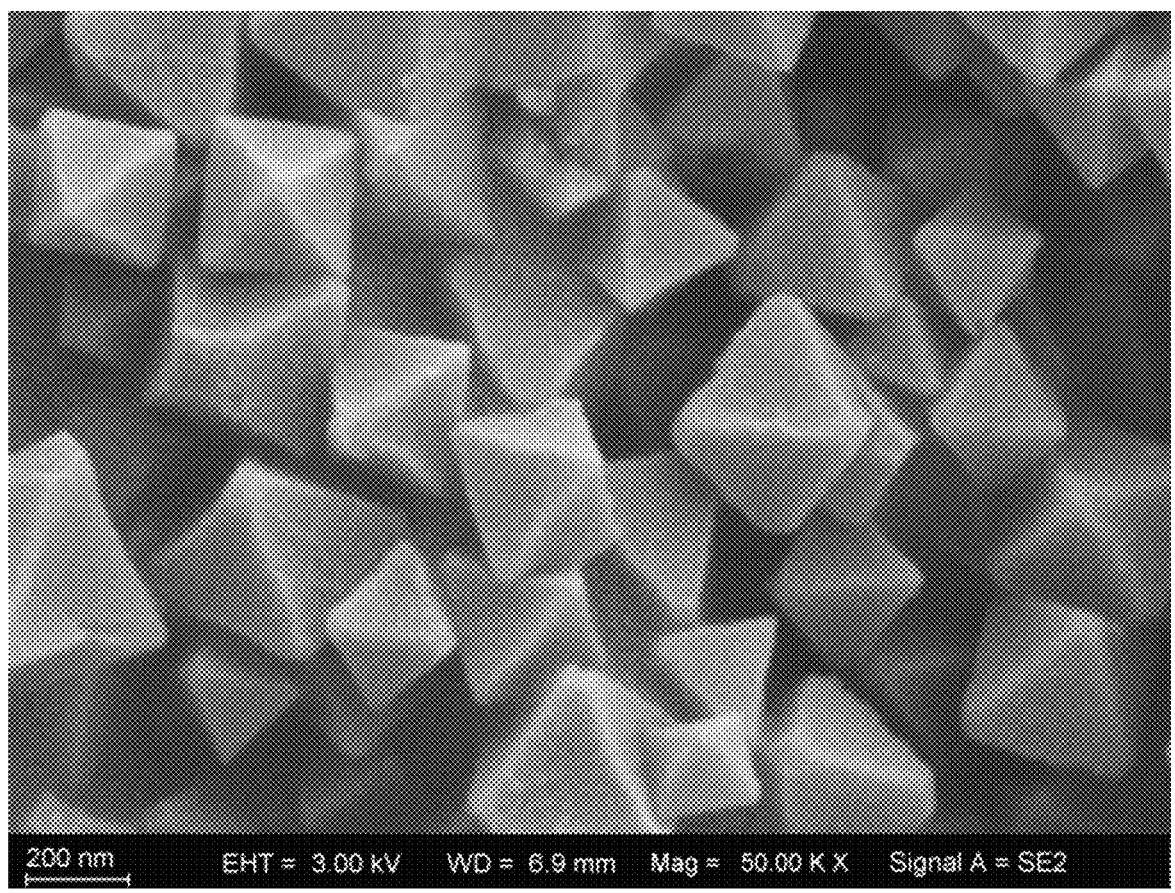
FIG. 4 shows a scanning electron microscopy (SEM) image of the hierarchical porous defect UiO-66 material prepared in Example 1 of the present disclosure.

As shown in FIG. 4, the material after heat treatment still maintains a regular octahedral configuration of UiO-66.

Example 2

(1) At ambient temperature, two 30 mL glass sample bottles were taken and numbered 1 and 2. 0.2331 g of zirconium chloride (1 mmol) was added into sample bottle 1, and 0.0831 g of terephthalic acid (0.5 mmol) and 0.0906 g of 2-aminoterephthalic acid (0.5 mmol) were added into sample bottle 2, such that a molar ratio of the zirconium chloride to ligands was 1:1.

(2) 10 mL of DMF was added into the sample bottles 1 and 2 separately, and resulting solutions were placed in an ultrasonic oscillator and ultrasonically treated until they were completely dissolved. Then, the ligand solution in sample bottle 2 was transferred to sample bottle 1, and 2.86 mL of acetic acid (50 mmol) and 20 μL of deionized water were added in sequence. A resulting reaction solution in sample bottle 1 was subjected to ultrasonic vibration for 0.5 min, and then transferred to a 120° C. oven and reacted for 24 h to obtain a yellow-brown UiO-66 material with a mixed ligand.

(3) The yellow-brown UiO-66 material with a mixed ligand in step (2) was transferred to a 50 mL centrifuge tube, and then centrifuged at 6,000 rpm for 15 min. A resulting precipitate was washed and centrifuged 2 times with 20 mL of DMF to wash away residual mixed ligand and acetic acid in the material. Then, the precipitate was washed and centrifuged 2 times with 20 mL of methanol to wash away the residual mixed ligand, acetic acid, and DMF in the material. Then, the precipitate was washed and centrifuged 2 times with 20 mL of deionized water to wash away residual organic solvents in the material. A resulting washed sample was frozen in an ultra-low temperature refrigerator, and then transferred to a freeze dryer, and freeze-dried for 24 h to obtain a dried sample.

(4) The dried sample obtained in (3) was ground and added into a porcelain boat, then the porcelain boat was transferred to a muffle furnace and a resulting ground sample was subjected to heat treatment at a high temperature of 350° C. for 2 h to obtain a hierarchical porous defect UiO-66 material.

In step (4), the products before and after the heat treatment were subjected to adsorption capacity test, volume test, infrared test, and appearance characterization. The results are shown in FIG. 5 to FIG. 8.

Figure 5:
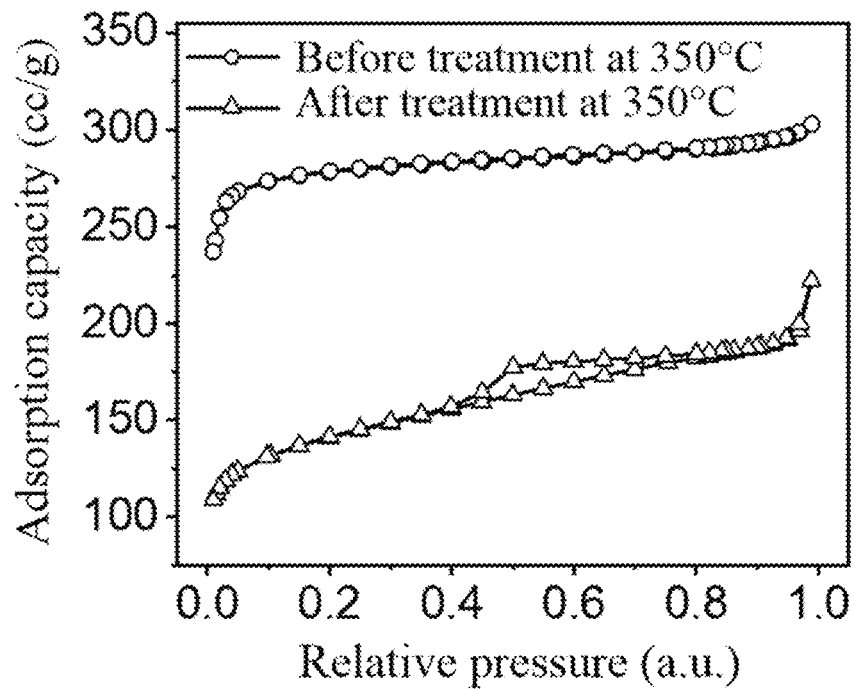
FIG. 5 shows nitrogen adsorption-desorption curves of the products obtained before and after heat treatment during constructing hierarchically porous defects of the UiO-66 material in Example 2 of the present disclosure.

As shown in FIG. 5, the material after the heat treatment shows a reduced nitrogen adsorption performance and a reduced specific surface area.

Figure 6:
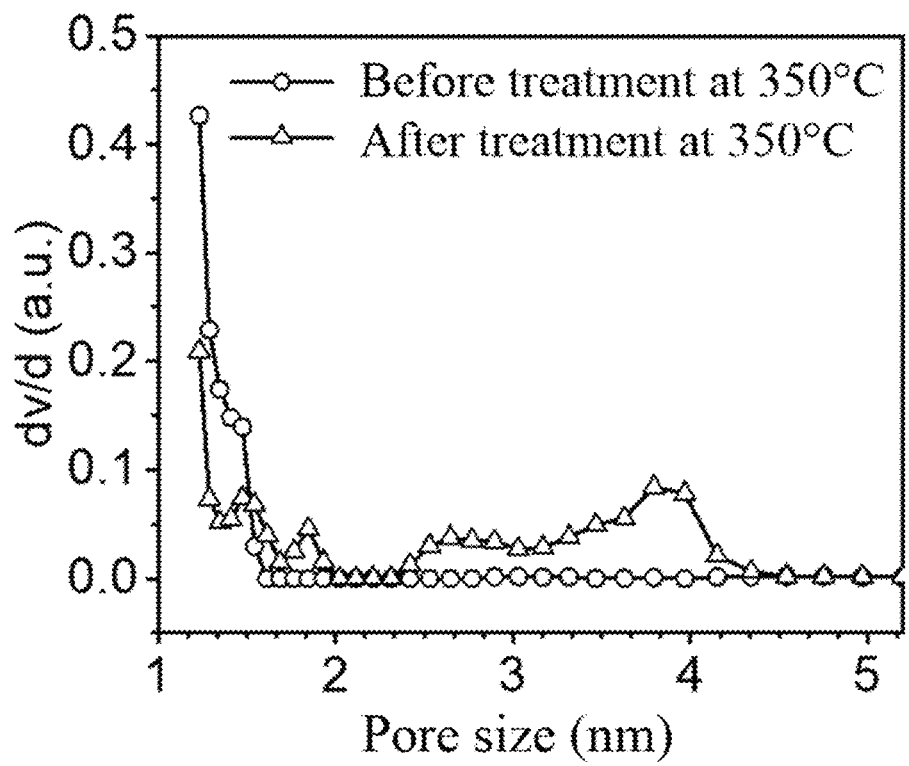
FIG. 6 shows a pore size distribution of the products obtained before and after heat treatment during constructing hierarchically porous defects of the UiO-66 material in Example 2 of the present disclosure.

As shown in FIG. 6, the material before heat treatment only has microporous structures less than 2 nm; after heat treatment, the material has mesoporous structures of 2 nm to 4 nm.

Figure 7:
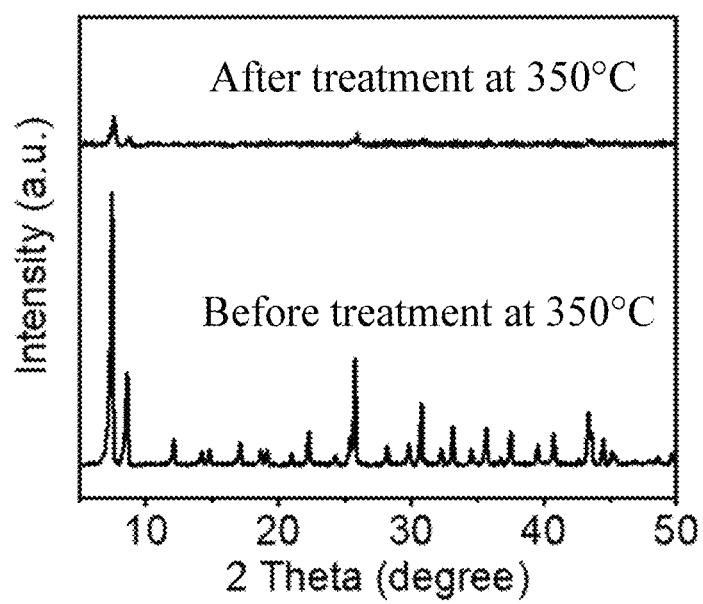
FIG. 7 shows XRD patterns of the products obtained before and after heat treatment during constructing hierarchically porous defects of the UiO-66 material in Example 2 of the present disclosure.

As shown in FIG. 7, although the material after the heat treatment shows an obviously reduced peak intensity, its characteristic peak position does not change significantly, indicating that the crystal structure of the material does not change significantly.

Figure 8:
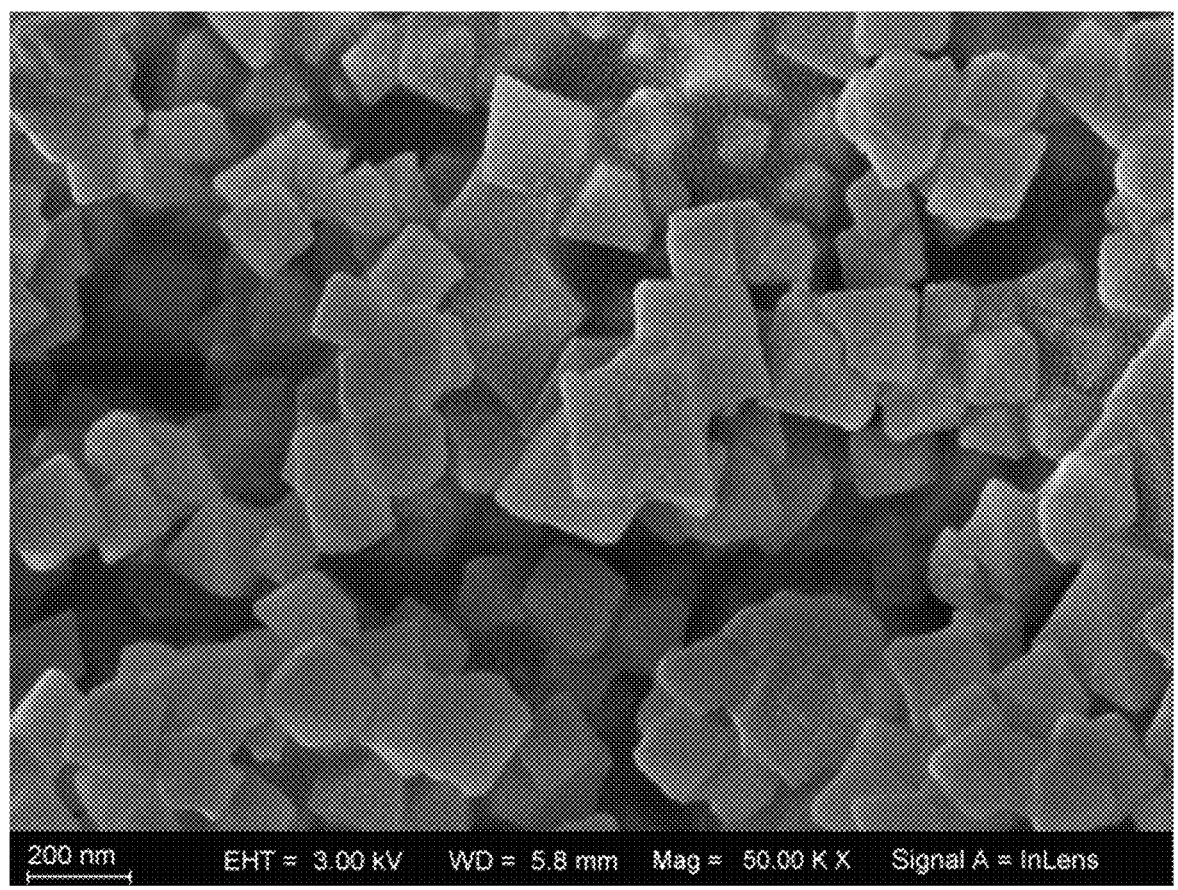
FIG. 8 shows an SEM image of the hierarchical porous defect UiO-66 material prepared in Example 2 of the present disclosure.

As shown in FIG. 8, the material after heat treatment still maintains a regular octahedral configuration of UiO-66 to a certain extent.

Example 3

(1) At ambient temperature, two 30 mL glass sample bottles were taken and numbered 1 and 2. 0.2331 g of zirconium chloride (1 mmol) was added into sample bottle 1, and 0.0498 g of terephthalic acid (0.3 mmol) and 0.1268 g of 2-aminoterephthalic acid (0.7 mmol) were added into sample bottle 2, such that a molar ratio of the zirconium chloride to ligands was 1:1.

(2) 10 mL of DMF was added into the sample bottles 1 and 2 separately, and resulting solutions were placed in an ultrasonic oscillator and ultrasonically treated until they were completely dissolved. Then, the ligand solution in sample bottle 2 was transferred to sample bottle 1, and 2.86 mL of acetic acid (50 mmol) and 20 μL of deionized water were added in sequence. A resulting reaction solution in sample bottle 1 was subjected to ultrasonic vibration for 0.5 min, and then transferred to a 120° C. oven and reacted for 24 h to obtain a yellow-brown UiO-66 material with a mixed ligand.

(3) The yellow-brown UiO-66 material with a mixed ligand in step (2) was transferred to a 50 mL centrifuge tube, and then centrifuged at 6,000 rpm for 15 min. A resulting precipitate was washed and centrifuged 2 times with 20 mL of DMF to wash away residual mixed ligand and acetic acid in the material. Then, the precipitate was washed and centrifuged 2 times with 20 mL of methanol to wash away the residual mixed ligand, acetic acid, and DMF in the material. Then, and the precipitate was washed and centrifuged 2 times with 20 mL of deionized water to wash away residual organic solvents in the material. A resulting washed sample was frozen in an ultra-low temperature refrigerator, and then transferred to a freeze dryer, and freeze-dried for 24 h to obtain a dried sample.

(4) The dried sample obtained in (3) was ground and added into a porcelain boat, then the porcelain boat was transferred to a muffle furnace and a resulting ground sample was subjected to heat treatment at a high temperature of 350° C. for 2 h to obtain a hierarchical porous defect UiO-66 material.

In step (4), the products before and after the heat treatment were subjected to adsorption capacity test, volume test, infrared test, and appearance characterization. The results are shown in FIG. 9 to FIG. 12.

Figure 9:
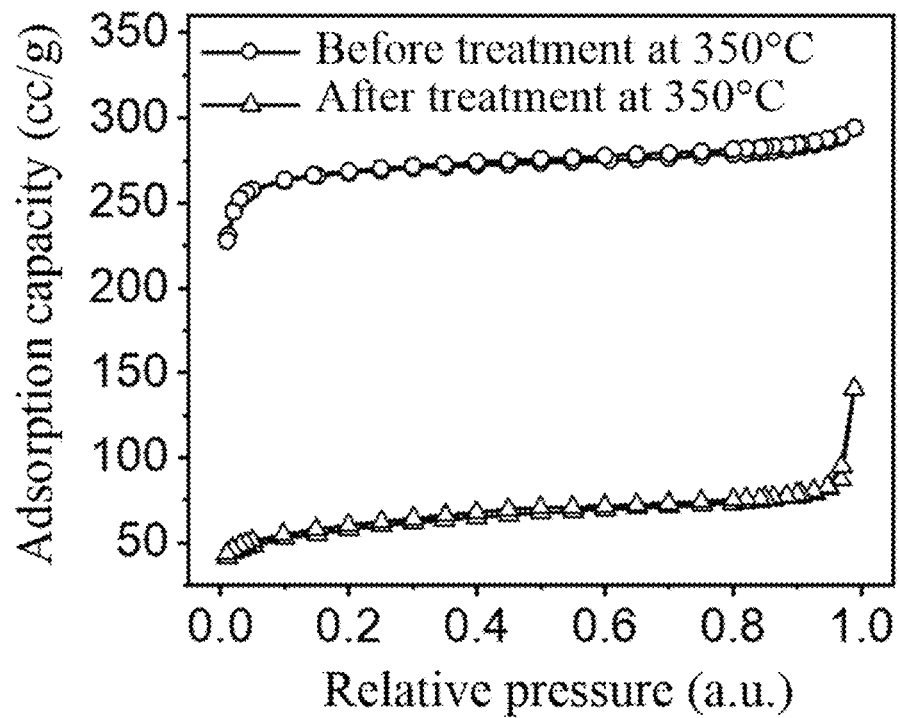
FIG. 9 shows nitrogen adsorption-desorption curves of the products obtained before and after heat treatment during constructing hierarchically porous defects of the UiO-66 material in Example 3 of the present disclosure.

As shown in FIG. 9, the material after the heat treatment shows a reduced nitrogen adsorption performance and a reduced specific surface area.

Figure 10:
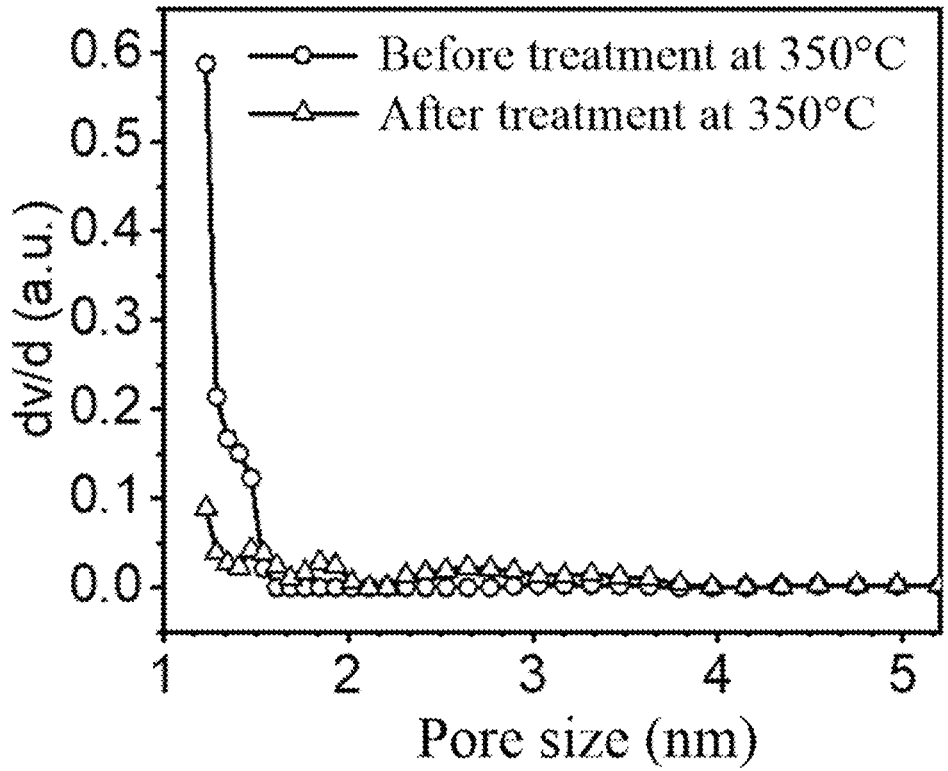
FIG. 10 shows a pore size distribution of the products obtained before and after heat treatment during constructing hierarchically porous defects of the UiO-66 material in Example 3 of the present disclosure.

As shown in FIG. 10, the material before heat treatment only has microporous structures less than 2 nm; after heat treatment, the material has a relatively reduced content of micropores and a small amount of 2 nm to 4 nm mesoporous structure is appeared.

Figure 11:
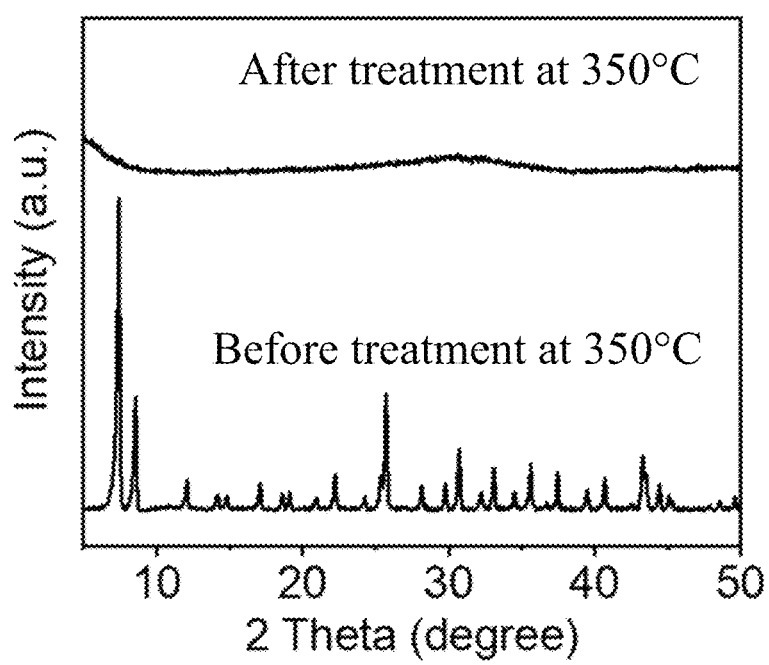
FIG. 11 shows XRD patterns of the products obtained before and after heat treatment during constructing hierarchically porous defects of the UiO-66 material in Example 3 of the present disclosure.

As shown in FIG. 11, the material after the heat treatment shows a reduced characteristic peak intensity, and its characteristic peak was not significant, but the material still maintains a certain crystal structure.

Figure 12:
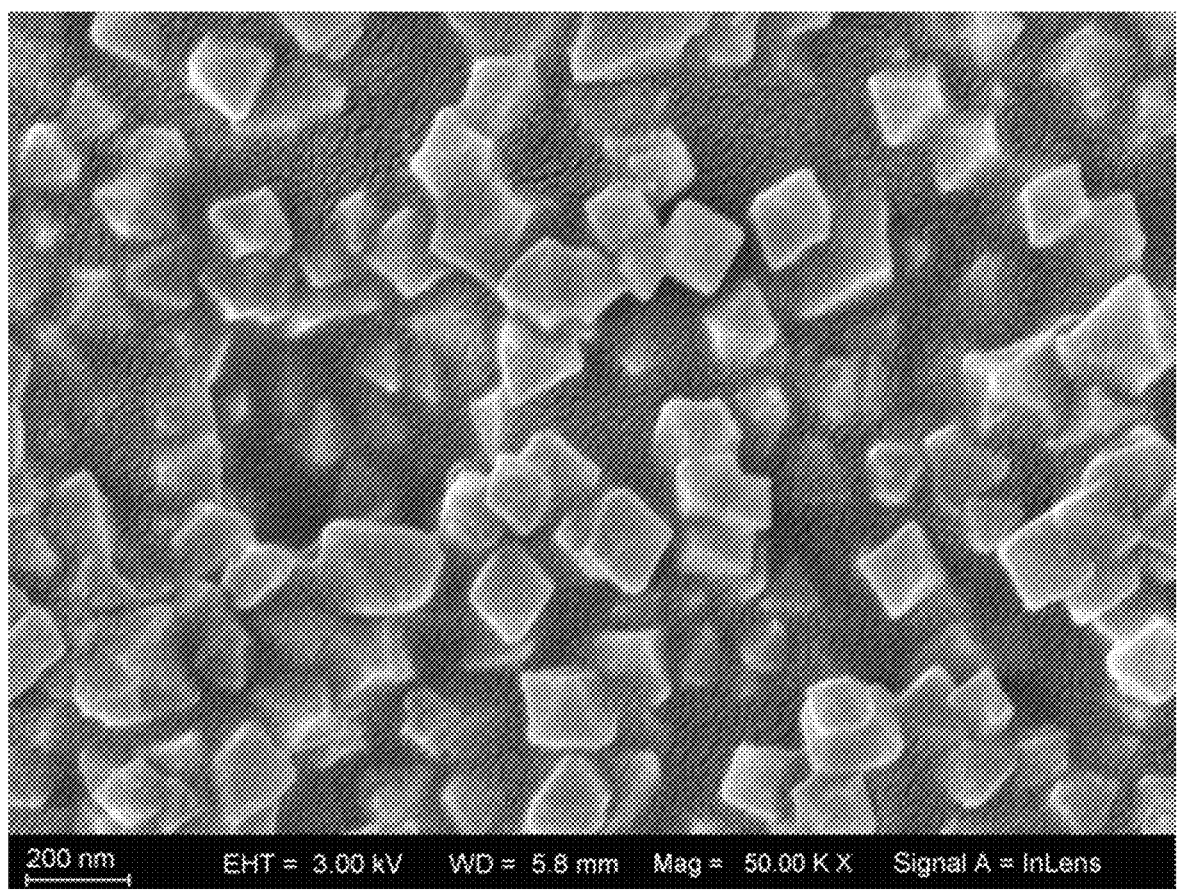
FIG. 12 shows an SEM image of the hierarchical porous defect UiO-66 material prepared in Example 3 of the present disclosure.

As shown in FIG. 12, the material after the heat treatment still maintains a regular octahedral configuration of UiO-66.

Example 4

Example 4 was performed according to the method of Example 1, except that the 2-aminoterephthalic acid was replaced with 2-aminoisophthalic acid.

In step (4) of Example 4, the products before and after the heat treatment were subjected to adsorption capacity test, volume test, infrared test, and appearance characterization. The results are shown in FIG. 13 to FIG. 16.

Figure 13:
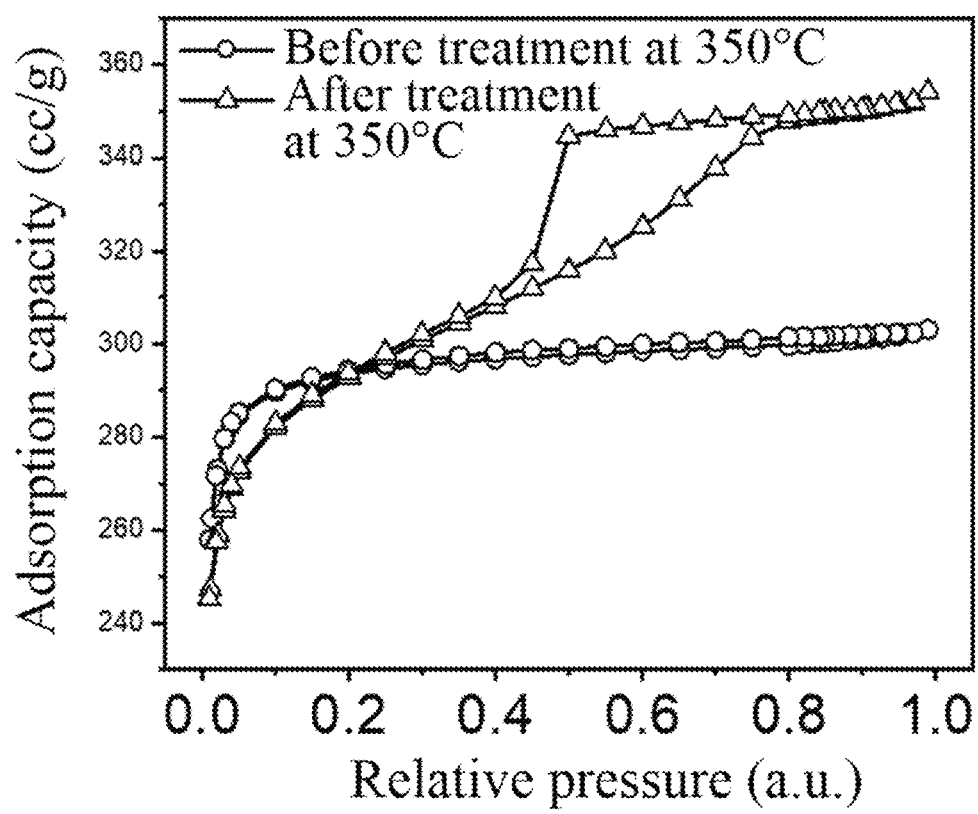
FIG. 13 shows nitrogen adsorption-desorption curves of the products obtained before and after heat treatment during constructing hierarchically porous defects of the UiO-66 material in Example 4 of the present disclosure.

As shown in FIG. 13, after the 2-aminoterephthalic acid is replaced with 2-aminoisophthalic acid, the material after the heat treatment shows a reduced nitrogen adsorption performance and a reduced specific surface area.

Figure 14:
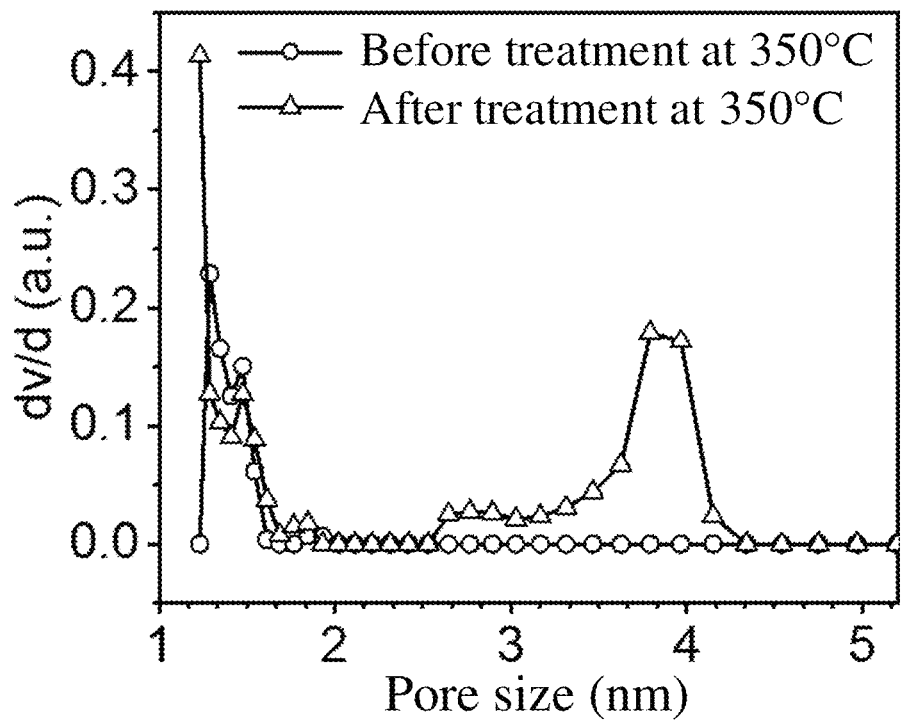
FIG. 14 shows a pore size distribution of the products obtained before and after heat treatment during constructing hierarchically porous defects of the UiO-66 material in Example 4 of the present disclosure.

As shown in FIG. 14, the material before heat treatment only has microporous structures less than 2 nm; after heat treatment, the material has mesoporous structures of 2 nm to 4 nm.

Figure 15:
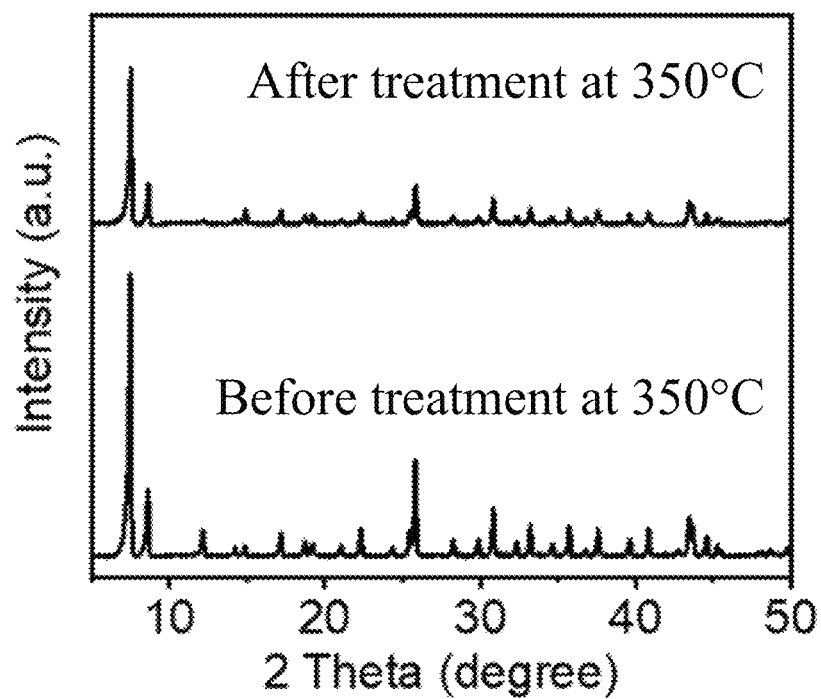
FIG. 15 shows XRD patterns of the products obtained before and after heat treatment during constructing hierarchically porous defects of the UiO-66 material in Example 4 of the present disclosure.

As shown in FIG. 15, although the material after the heat treatment shows a slightly reduced peak intensity, a crystal structure of the material does not change significantly.

Figure 16:
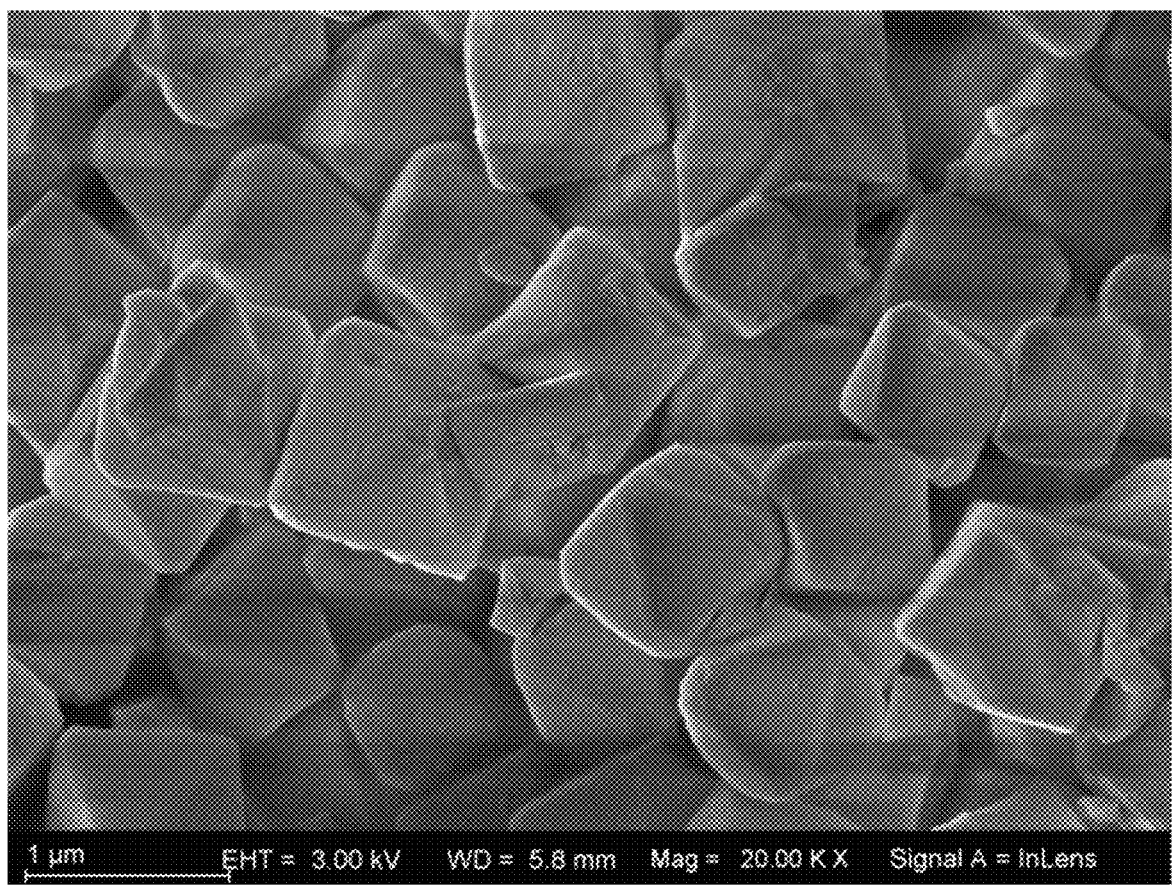
FIG. 16 shows an SEM image of the hierarchical porous defect UiO-66 material prepared in Example 4 of the present disclosure.

As shown in FIG. 16, the material after heat treatment still maintains a regular octahedral configuration of UiO-66 to a certain extent.

Comparative Example 1

The Comparative Example 1 was a control group without adding the monocarboxylic acid regulator acetic acid. The Comparative Example 1 was performed according to the method of Example 1, except that acetic acid was not added, and other reaction conditions remained unchanged.

In step (4) of the Comparative Example 1, the products before and after the heat treatment were subjected to adsorption capacity test, volume test, infrared test, and appearance characterization. The results are shown in FIG. 17 to FIG. 20.

Figure 17:
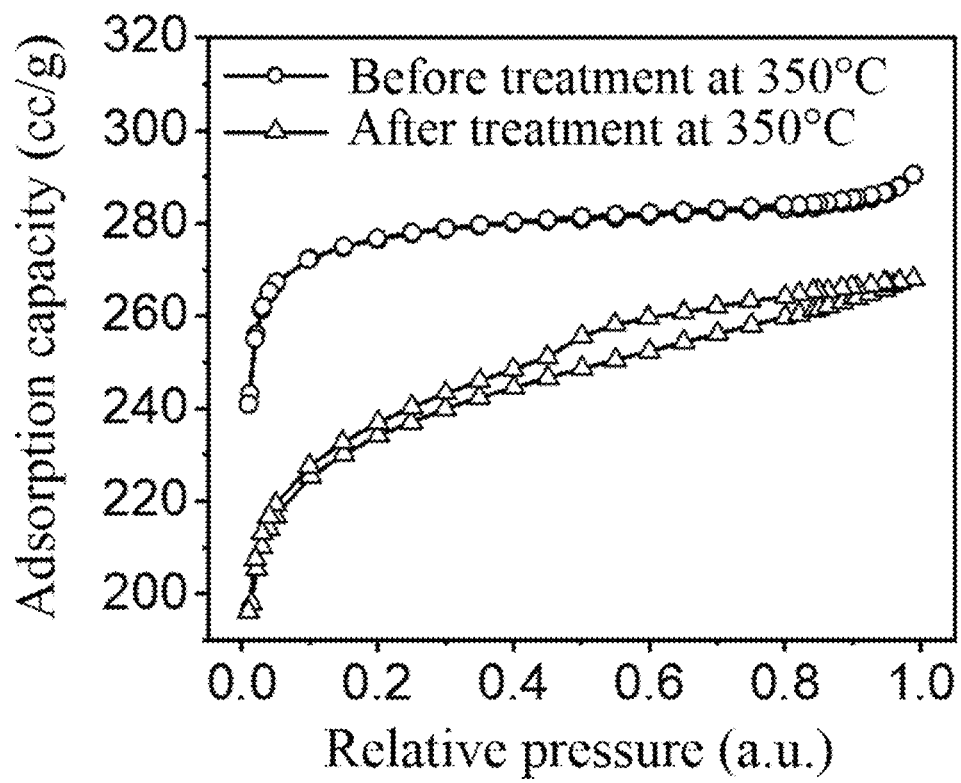
FIG. 17 shows nitrogen adsorption-desorption curves of the products obtained before and after heat treatment during constructing hierarchically porous defects of the UiO-66 material in Comparative Example 1 of the present disclosure.

As shown in FIG. 17, without adding organic acid, the material after the heat treatment shows a reduced nitrogen adsorption performance and a reduced specific surface area.

Figure 18:
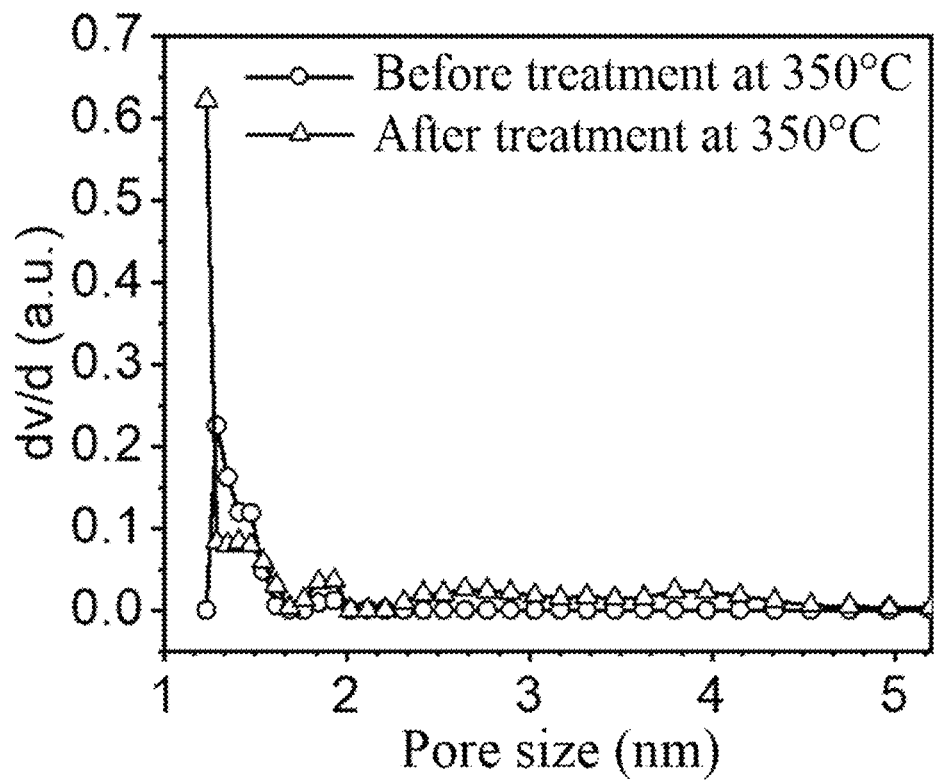
FIG. 18 shows a pore size distribution of the products obtained before and after heat treatment during constructing hierarchically porous defects of the UiO-66 material in Comparative Example 1 of the present disclosure.

As shown in FIG. 18, without adding organic acid, the material before heat treatment only has microporous structures less than 2 nm; after heat treatment, the material has an extremely small amount of mesoporous structures of 2 nm to 4 nm.

Figure 19:
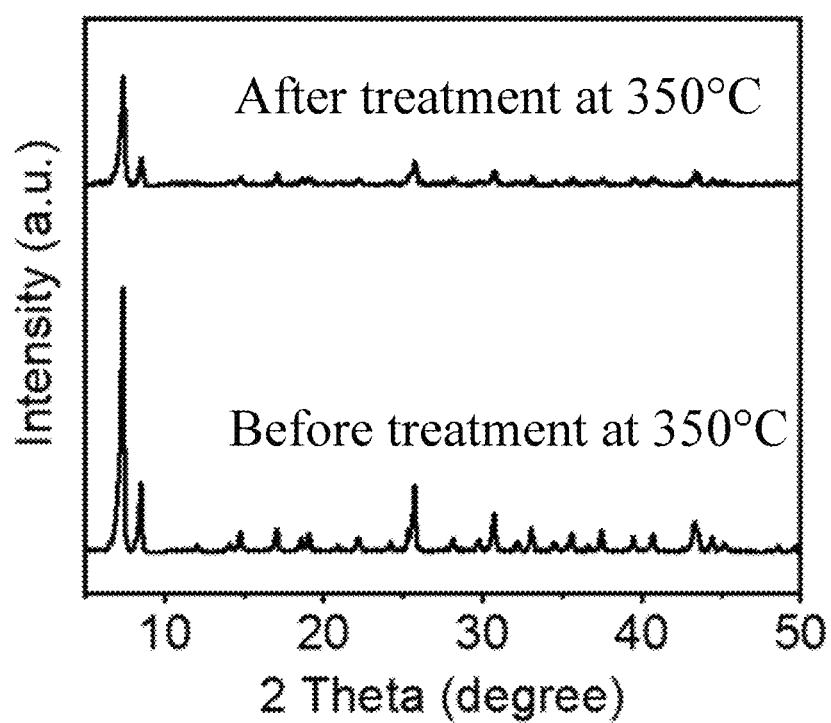
FIG. 19 shows XRD patterns of the products obtained before and after heat treatment during constructing hierarchically porous defects of the UiO-66 material in Comparative Example 1 of the present disclosure.

As shown in FIG. 19, without adding organic acid, although the material after the heat treatment shows a slightly reduced peak intensity, a crystal structure of the material does not change significantly.

Figure 20:
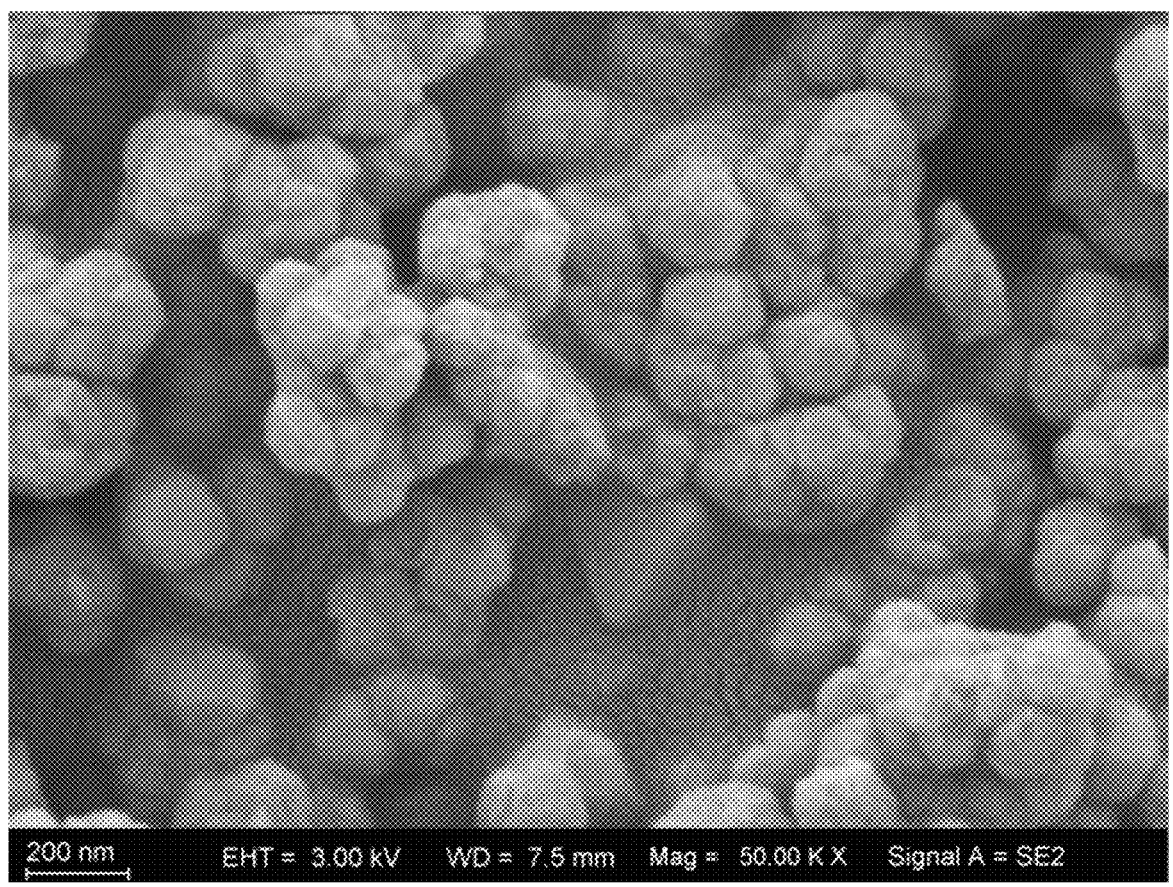
FIG. 20 shows an SEM image of the hierarchical porous defect UiO-66 material prepared in Comparative Example 1 of the present disclosure.

As shown in FIG. 20, without adding organic acid, the material after heat treatment does not have a regular octahedral configuration, and has a rough surface.

Comparative Example 2

The Comparative Example 2 was performed according to the method of Example 1, except that the 2-aminoterephthalic acid was replaced with 5-aminoisophthalic acid, and other reaction conditions remained unchanged.

In step (4) of the Comparative Example 2, the products before and after the heat treatment were subjected to adsorption capacity test, volume test, infrared test, and appearance characterization. The results are shown in FIG. 21 to FIG. 24.

Figure 21:
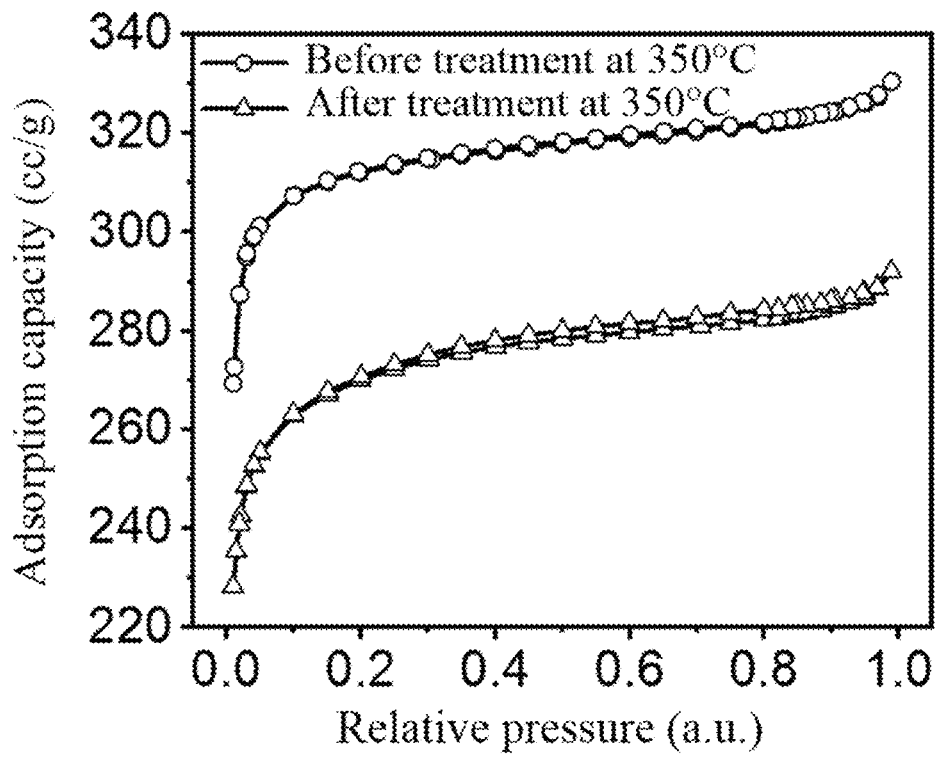
FIG. 21 shows nitrogen adsorption-desorption curves of the products obtained before and after heat treatment during constructing hierarchically porous defects of the UiO-66 material in Comparative Example 2 of the present disclosure.

As shown in FIG. 21, after the 2-aminoterephthalic acid was replaced with 5-aminoisophthalic acid, the material after the heat treatment shows a reduced nitrogen adsorption performance and a reduced specific surface area.

Figure 22:
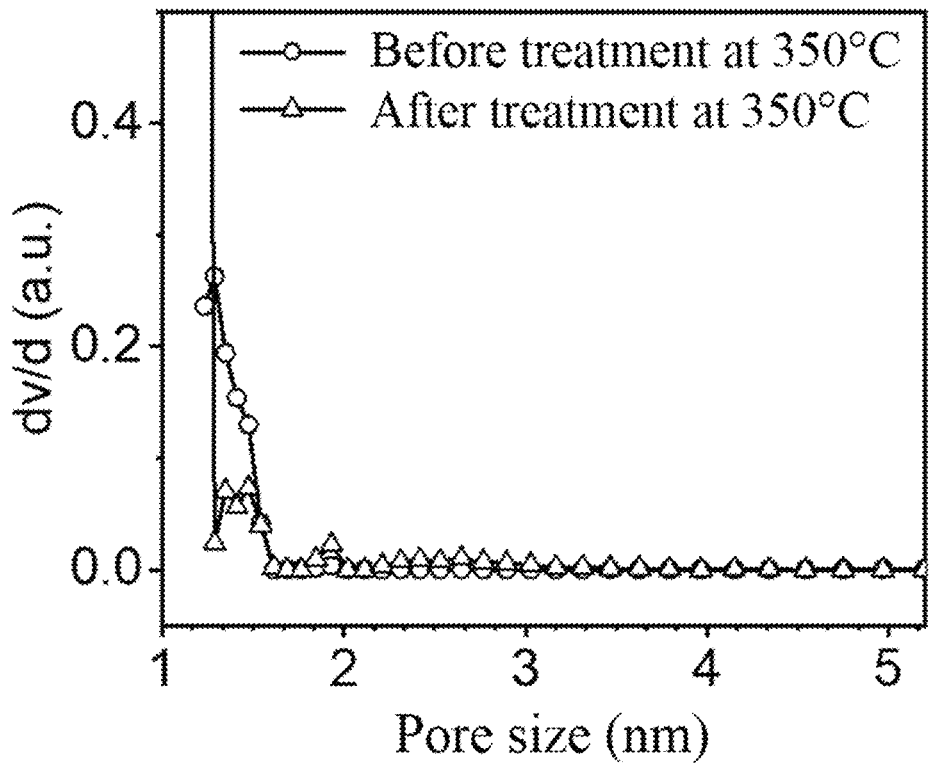
FIG. 22 shows a pore size distribution of the products obtained before and after heat treatment during constructing hierarchically porous defects of the UiO-66 material in Comparative Example 2 of the present disclosure.

As shown in FIG. 22, the material before heat treatment only has microporous structures less than 2 nm; after heat treatment, the material has an extremely small amount of mesoporous structures of 2 nm to 3 nm.

Figure 23:
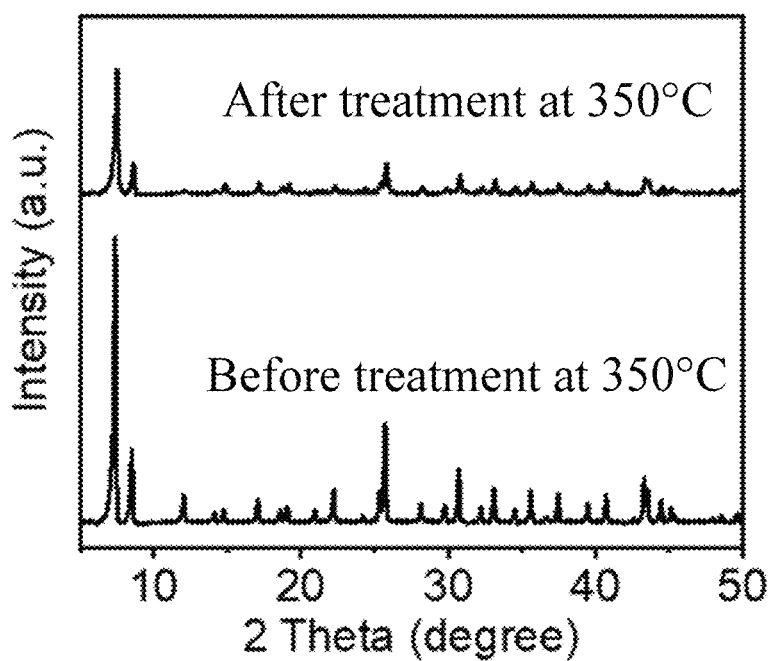
FIG. 23 shows XRD patterns of the products obtained before and after heat treatment during constructing hierarchically porous defects of the UiO-66 material in Comparative Example 2 of the present disclosure.

As shown in FIG. 23, although the material after the heat treatment shows a slightly reduced peak intensity, a crystal structure of the material does not change significantly.

Figure 24:
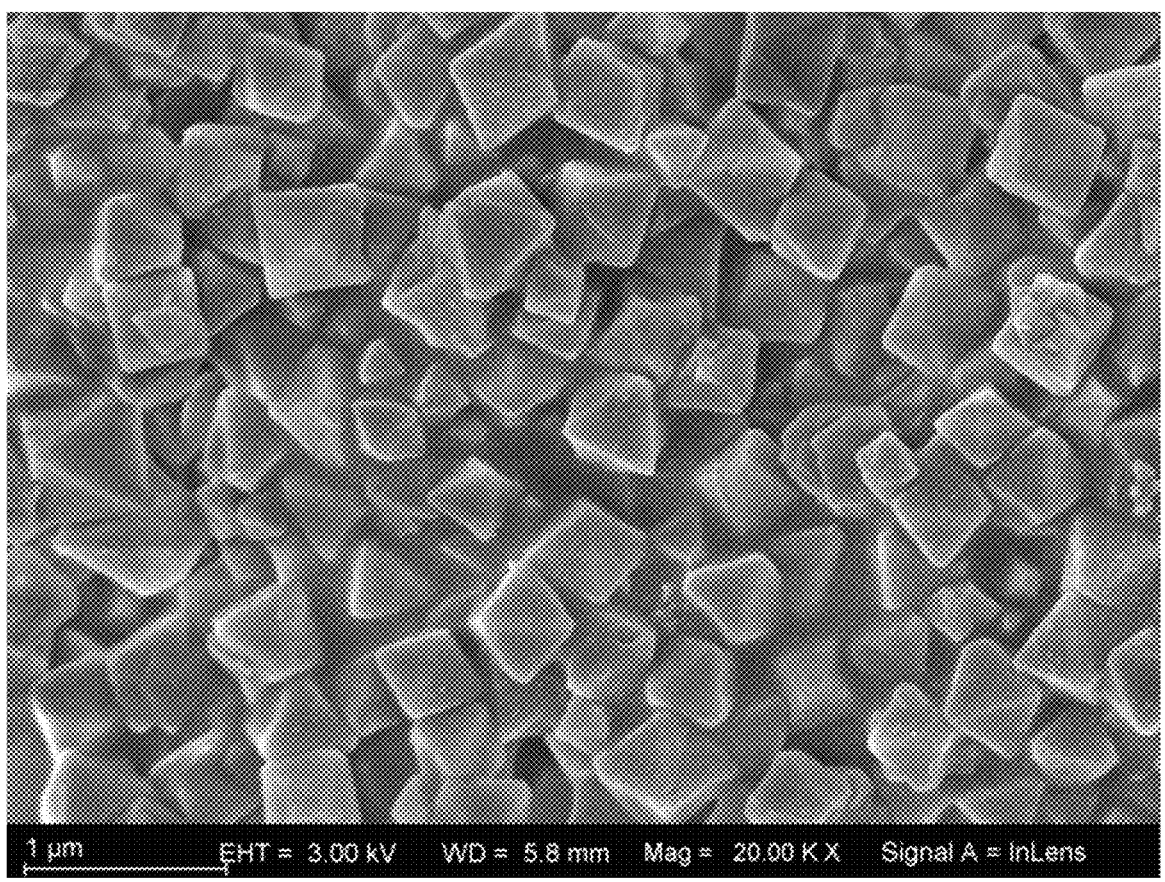
FIG. 24 shows an SEM image of the hierarchical porous defect UiO-66 material prepared in Comparative Example 2 of the present disclosure.

As shown in FIG. 24, the material after heat treatment still maintains a regular octahedral configuration of UiO-66.

As shown in the above examples, the method of the present disclosure is simple to operate, and a product could be obtained with high purity and yield. The prepared hierarchical porous defect UiO-66 material not only retains an original microporous structure, but also generates mesoporous level defects, endowing the material hierarchically porous properties. In addition, the method could realize efficient control on a proportion of mesoporous defects in the material by adjusting a ratio of the mixed ligand.

Although the present disclosure is described in detail in conjunction with the foregoing embodiments, they are only a part of, not all of, the embodiments of the present disclosure. Other embodiments could be obtained based on these embodiments without creative efforts, and all of these embodiments shall fall within the scope of the present disclosure.

What is claimed is:

1. A method for preparing a hierarchical porous defect UiO-66 material, comprising the following steps:

mixing a zirconium ion source, a mixed ligand, an organic acid, N,N-dimethylformamide (DMF), and water to obtain a mixture; and subjecting the mixture to reaction under heating, washing, freeze-drying, and heat treatment in sequence to obtain the hierarchical porous defect UiO-66 material;

wherein hierarchical pores of the hierarchical porous defect UiO-66 material comprise micropores and mesopores; the micropores each have a pore size of not greater than 2 nm; and the mesopores each have a pore size of 2 nm to 4 nm; and the mixed ligand comprises terephthalic acid and a trisubstituted benzene series; and the trisubstituted benzene series is one or two selected from the group consisting of 2-aminoterephthalic acid and 2-aminoisophthalic acid.

2. The method of claim 1, wherein the zirconium ion source is one or two selected from the group consisting of zirconium chloride and zirconium oxychloride; and the organic acid is one or more selected from the group consisting of formic acid, acetic acid, and benzoic acid.

3. The method of claim 2, wherein a molar ratio of the zirconium ion source to the mixed ligand is in a range of 1:0.5 to 1:2;

a molar ratio of the zirconium ion source to the DMF is in a range of 1:130 to 1:520;

a molar ratio of the zirconium ion source to the organic acid is in a range of 1:10 to 1:200; and a molar ratio of the zirconium ion source to the water is in a range of 1:0.5 to 1:2.

4. The method of claim 1, wherein a molar ratio of the zirconium ion source to the mixed ligand is in a range of 1:0.5 to 1:2;

a molar ratio of the zirconium ion source to the DMF is in a range of 1:130 to 1:520;

a molar ratio of the zirconium ion source to the organic acid is in a range of 1:10 to 1:200; and a molar ratio of the zirconium ion source to the water is in a range of 1:0.5 to 1:2.

5. The method of claim 1, wherein a molar ratio of the terephthalic acid to the trisubstituted benzene series is in a range of (0-1): (0-1), excluding 0.

6. The method of claim 1, wherein the reaction under heating is conducted at a temperature of 120° C. to 160° C. for 24 h to 72 h.

7. The method of claim 1, wherein the freeze-drying is conducted at a temperature of −60° C. to −40° C. for 18 h to 36 h.

8. The method of claim 1, wherein the heat treatment is conducted at a temperature of 325° C. to 375° C. for 0.25 h to 4 h.

9. A hierarchical porous defect UiO-66 material prepared by the method of claim 1, wherein hierarchical pores of the hierarchical porous defect UiO-66 material comprise micropores and mesopores; the micropores each have a pore size of not greater than 2 nm; and the mesopores each have a pore size of 2 nm to 4 nm.

10. The hierarchical porous defect UiO-66 material of claim 9, wherein the zirconium ion source is one or two selected from the group consisting of zirconium chloride and zirconium oxychloride; and the organic acid is one or more selected from the group consisting of formic acid, acetic acid, and benzoic acid.

11. The hierarchical porous defect UiO-66 material of claim 9, wherein a molar ratio of the zirconium ion source to the mixed ligand is in a range of 1:0.5 to 1:2;

a molar ratio of the zirconium ion source to the DMF is in a range of 1:130 to 1:520;

a molar ratio of the zirconium ion source to the organic acid is in a range of 1:10 to 1:200; and a molar ratio of the zirconium ion source to the water is in a range of 1:0.5 to 1:2.

12. The hierarchical porous defect UiO-66 material of claim 9, wherein a molar ratio of the terephthalic acid to the trisubstituted benzene series is in a range of (0-1):(0-1), excluding 0.

\* \* \* \* \*